US009959571B2

(12) United States Patent
Friedman

(10) Patent No.: US 9,959,571 B2
(45) Date of Patent: May 1, 2018

(54) USER PUBLISHED AUCTIONS IN ONLINE MEDIUMS

(71) Applicant: Ten-X, LLC, Irvine, CA (US)

(72) Inventor: Robert Friedman, Laguna Hills, CA (US)

(73) Assignee: Ten-X, LLC, Irvine, CA (US)

( * ) Notice: Subject to any disclaimer, the term of this patent is extended or adjusted under 35 U.S.C. 154(b) by 266 days.

(21) Appl. No.: 14/214,505

(22) Filed: Mar. 14, 2014

(65) Prior Publication Data

US 2014/0279157 A1 Sep. 18, 2014

Related U.S. Application Data

(60) Provisional application No. 61/800,501, filed on Mar. 15, 2013.

(51) Int. Cl.
*G06Q 30/00* (2012.01)
*G06F 17/30* (2006.01)
*G06Q 30/08* (2012.01)

(52) U.S. Cl.
CPC .................................... *G06Q 30/08* (2013.01)

(58) Field of Classification Search
CPC ...................................................... G06Q 30/08
USPC ......................................................... 705/26.3
See application file for complete search history.

(56) References Cited

U.S. PATENT DOCUMENTS

2009/0259564 A1 10/2009 Barkerding
2009/0265233 A1 10/2009 Sendo et al.
2012/0316980 A1 12/2012 Rotman et al.
2014/0089126 A1* 3/2014 Friedman ............... G06Q 30/08 705/26.3

FOREIGN PATENT DOCUMENTS

WO WO 2011/009141 A1 1/2011

OTHER PUBLICATIONS

Widgetbox opens web widget marketplace; new service makes it easy to assemble, share and integrate web widgets. (Sep. 25, 2006). PR Newswire Retrieved from https://search.proquest.com/docview/453919912?accountid=14753.*
International Search Report and Written Opinion dated Aug. 11, 2014, Application No. PCT/US2014/029514, 7 Pages.

* cited by examiner

*Primary Examiner* — Kathleen Palavecino
(74) *Attorney, Agent, or Firm* — Mahamedi IP Law LLP

(57) ABSTRACT

A method and system is disclosed for user-published interactive widgets for auctions hosted by an auction forum resource. Examples include an auction forum configured to generate a script associated with an auction upon a publisher-request, and to provide the script to be published on the publisher's resource, resulting in an external interactive component displayed on the publisher's resource. Example features may be configured to respond to user inputs submitted from the interactive component. Furthermore, reward logic can be included to issue a reward to the publisher associated with the script request.

20 Claims, 4 Drawing Sheets

USER PUBLISHED AUCTIONS IN ONLINE MEDIUMS

RELATED APPLICATION

This application claims the benefit of priority to Provisional Application No. 61/800,501 filed on Mar. 15, 2013, entitled USER PUBLISHED AUCTIONS IN ONLINE MEDIUMS; the aforementioned priority application being hereby incorporated by references in its entirety.

TECHNICAL FIELD

Examples described herein relate to online markets, and more specifically, to a system and method for user published auctions in online mediums.

BACKGROUND

Numerous online auction forums exist that enable consumers and sellers to transact for various kinds of items, such as collectibles, electronics and other goods or services. However, an auction forum user must typically engage the actual auction forum site in order to place a bid and view information pertaining to a particular auction.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
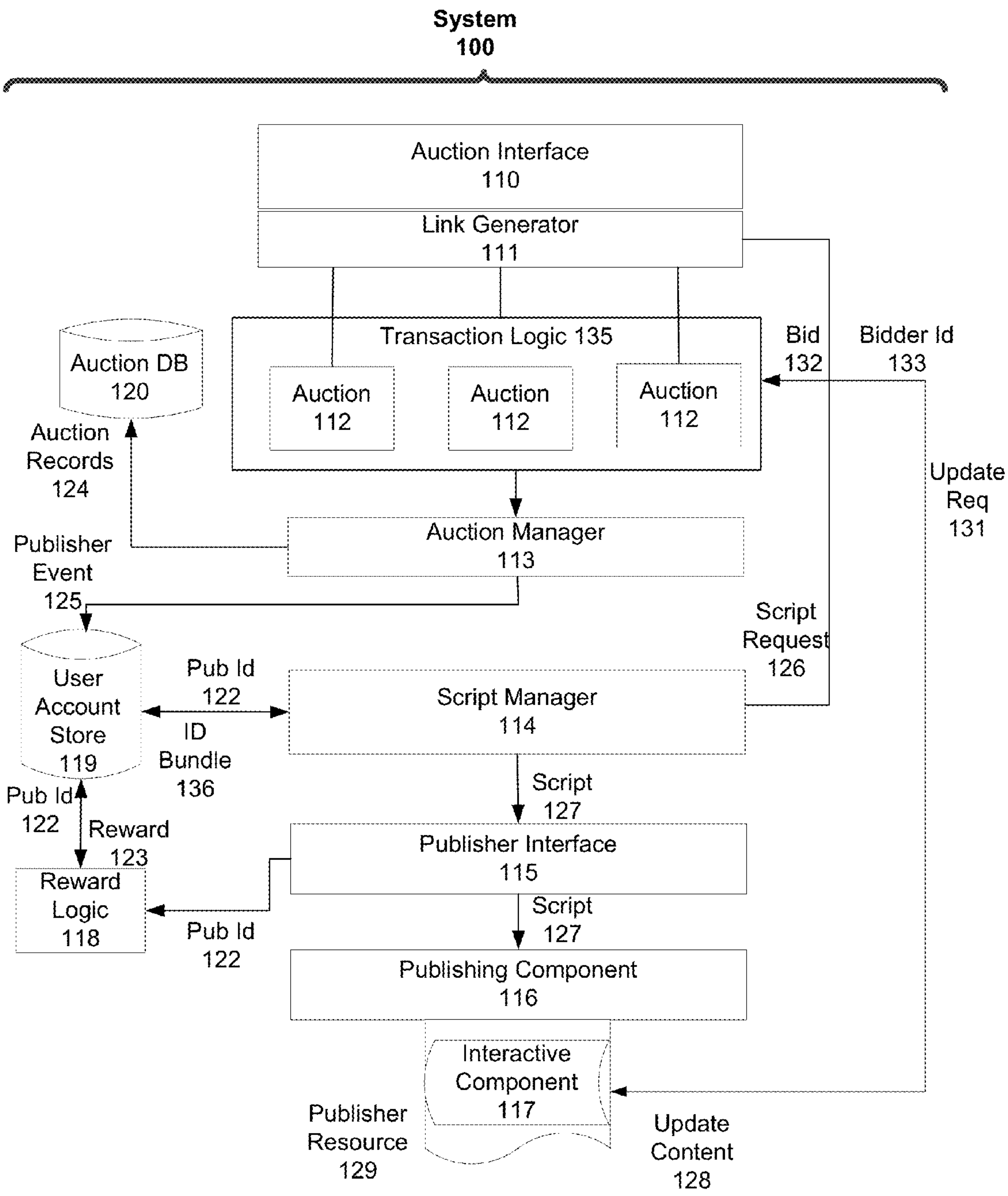
FIG. 1 illustrates a system for auction script publication and interaction through an online medium.

Examples described herein enable individuals to incorporate a functional aspect into a web resource (e.g., social network page, blog) of their choosing for the purpose of publishing a live online auction hosted at another site.

Online auction forums allow auction users to bid on a variety of items including, for example, homes, real-estate notes, commercial property, motor vehicles (e.g., automobiles, motorcycles, boats), consumer electronics, collectibles, and/or clothing. Typically, bidders must utilize the auction forum itself in order to place bids on the auctioned items.

A system and method are disclosed relating to re-publication of live online auctions, with the possibility of reward issuance. Examples are described in which auction users can request a script pertaining to a particular auction, which can then be published onto an outside resource, such as a webpage on a social media platform. The published script can result in an embedded interactive component on the outside resource. The interactive component may provide a user with auction information such as, for example, current highest bid, time left in the auction, etc. The interactive component can also allow a user to interact with the auction and submit bids accordingly. Thus, information inputted into the interactive component may be transmitted or communicated to the auction forum in order to update information relating to that particular auction.

Systems and methods for managing an auction forum include receiving a publisher request for an interactive auction feature corresponding to a specified auction of the auction forum. In response to the request the system can generate a script that is linked to the specified online auction hosted on the auction forum, and transmit the script to be published on an external resource selected by a publisher associated with the publisher request. The published script results in an interactive component on the external resource. Furthermore, the system can communicate with the interactive component to provide auction content corresponding to the specified online auction. The auction content can include various features, such as a live feature displaying a time left and a current highest bid in the specified auction. The auction content can also include details of the auction item, including a description of the item, seller information, a photograph of the auction item, etc. Further still, the system can process user inputs inputted on the interactive component for the specified online auction. These inputs can include submitted bids or request for more information about the auction or auction item from users interacting with the interactive component. Once the auction is completed and a winning bid is accepted, the auction forum can issue a reward to the publisher of the interactive content. Alternatively, the reward can be issued to the publisher for publishing the script. This reward can be issued in response to the winning bid being submitted on the interactive component published on the external resource.

The publisher's external resource can be a webpage associated with the publisher. For example, the external resource can be the publisher's webpage on a social media platform. Alternatively, the external resource can be the publisher's blog.

Among other benefits, examples described herein achieve a technical effect in which programs and operations that require access to resources of a network-based file system are performed significantly faster than more conventional approaches. For example, programs can asynchronously issue file system operation requests from the network-based file systems in order to implement programs such as copying directories. In turn, these programs can complete their objectives at a speed that is based on efficient utilization of the network's maximum transmission unit (MTU) and maximum bandwidth. Accordingly, examples such as described enable certain programs that require use of network-based file systems to complete their objectives in a fraction of the time as compared to more conventional approaches that rely on synchronous, message-based communications One or more variations can be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing variations can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, examples may be implemented in the form of computer-programs, or a computer usable carrier medium capable of carrying such a program.

System Architecture

FIG. 1 illustrates a system for enabling script publication and interaction through a publisher interface. A system 100 such as shown by an example of FIG. 1, can be implemented in connection with an online auction service for any type of commercial item, such as, for example, real property items, (e.g., homes, real-estate notes, commercial property), motor vehicles (e.g., automobiles, motorcycles, boats), consumer electronics, collectibles, or clothing. Furthermore, system 100 can be implemented in connection with any publisher interface such as, for example, a social media platform, website, blog, web application, etc.

In an example of FIG. 1, system 100 includes functionality that can be implemented by processes, logical components and/or modules. Furthermore, examples described with respect to FIG. 1, achieve a technical effect in which programs and operations that require access to resources included in FIG. 1 are performed significantly faster than more conventional approaches. Such components as shown can be programmatically employed to complete their objectives at a speed that is based on efficient utilization of the network's maximum transmission unit (MTU) and maximum bandwidth. Accordingly, examples such as described enable certain programs that require use of network-based file systems to complete their objectives in a fraction of the time as compared to more conventional approaches that rely on synchronous, message-based communications as between the client terminal and the network-based file systems.

Referring to FIG. 1, system 100 includes an auction interface 110, where auction users can participate in one or more auctions 112. The auction interface 110 can include a transaction logic 135 configured to transmit or communicate information relating to the auctions to an auction manager 113. This information can include data relating to past auctions, such as transaction histories, items sold, buyer information, seller information, bidder information, etc. (hereinafter "auction records" 124). The information can also include data relating to present auctions 112, which can also be communicated to the auction manager 113.

In variations, the system 100 can include a link generator 111. Upon a request by, for example, a publisher, the link generator 111 can be configured to transmit a script request 126 for a particular auction. In doing so, a publisher interested in publishing information relating to a particular auction can enable the link generator 111. The link generator 111 can then generate the script request 126 pertaining to that particular auction, and send it to the script manager 114.

The auction manager 113 can be configured or otherwise instructed to receive and process data from the transaction logic 135. Other examples can be configured so that the auction manager 113 receives data directly from the auction interface 110 and/or the auction utilities themselves. Upon receiving the data, the auction manager 113 may function to process and communicate the data accordingly. For example, data relating to an auction user's account, such as billing, auction user ID, transaction data, and account information, can be communicated to a user account store 119. As an addition or an alternative, all other data relating to an auction (e.g., auction records 124), can be transferred to an auction database 120 for storage and future access. Furthermore, the auction manager 113 can be configured or otherwise instructed to recognize, relay, process, and/or communicate publisher event information 125. The publisher event information 125 can include the script request 126, an entered bid 132, a script publication, a completed auction, an issued reward 123, etc. The auction manager 113 can communicate the publisher event information 125 to the user account store 119, as shown in FIG. 1, where it can be accessed by a script manager 114. Alternatively, if the publisher event information 125 includes the script request 126, it can be communicated directly to the script manager 114.

Furthermore, as stated above, the script request 126 can be communicated directly to the script manager 114. The script manager 114 can be configured to process the script request 126. For example, as shown in FIG. 1, the script manager 114 can deliver or otherwise communicate the script 127 pertaining to the script request 126 to a publisher interface 115. The publisher interface 115 can be a website or webpage, a social media platform, a blog, or any mechanism or application that can be used to publish a script 127. Furthermore, the script manager 114 can receive the publisher's ID 122 from the user account store 119, and can further communicate information relating to the script 127 to the user account store 119 in order to, for example, associate the script 127 with the publisher ID 122. Alternatively, as show in FIG. 1, the script manager 114 can bundle information relating to the script 127 with the publisher ID 122, and communicate the bundle 136 to the user account store 119. In practice, an auction user (e.g., a publisher) can enable the link generator 111 for a selected auction. The script request 126 associated with the selected auction can be communicated to the script manager 114, which can in turn deliver the proper script 127 to the publisher interface 115. Further, the script manager 114 may associate the auction user with the publisher ID 122, and combine that with the script request 126, in order to communicate the combination (i.e., ID bundle 136) to the user account store 119. In other variations, the ID bundle 136 may be communicated to a reward logic 118, which can use the bundle to issue a reward 123 to the proper user account, such as the publisher's account.

The script manager 114 can communicate the proper script 127 to the publisher interface 115. As described above, the publisher interface 115 can be a website or webpage, a social media platform, a blog, or any mechanism or application that can be used or enabled to publish the script 127. The publisher interface 115 can then issue or communicate the script 127 to a relevant publishing component 116 for publication. The publishing component 116 can be a webpage associated with the publisher, such as, for example, a publisher's social media page. However, the publishing component 116 can also be any content or component associated with the publisher interface 115.

Once the script 127 is communicated or delivered to the publishing component 116, the script 127 can then be embedded as an interactive component 117. The interactive component 117 can generate interactive content on the auction forum. For example, in some examples, the interactive component 117 can be in the form of a scroll over icon, which can accordingly produce a separate window displaying information relating to a particular auction. In other examples, the interactive component 117 can be in the form of a clickable icon that generates an interactive pop up window that allows a user to submit a bid or view information relating to the auction. In still other examples, the interactive component 117 can include a timer displaying the auction period, the current highest bid, a photo of the item up for auction, a brief description of the item being auctioned, the location of the item, and/or an interactive text box or bid interface allowing a user to submit a bid 132 on the spot. As shown by an example of FIG. 1, a user can submit the bid 132 through the interactive component 117 to the transaction logic 135 (e.g., provide the bid 132 directly to the transaction logic 135). The bid 132 can include a time stamp corresponding to the auction period. Additionally or alternatively, the user can utilize the interactive component 117 to submit an update request 131 to refresh the current status of the auction. However, data from the auction itself (e.g., time remaining in the auction, current highest bid, information relating to the item being auctioned, etc.) can also be streamed, or a live feed of updated content 128 relating to the auction can be displayed on the interactive component 117.

Further, the reward logic 118 can be configured to receive the publisher ID 122 from the publishing component 116. Alternatively, the reward logic 118 can receive the publisher ID 122 directly from the user account store 119, the publisher interface 115, the auction manager 113, and/or the script manager 114. The reward logic 118 may also be configured to send or otherwise communicate the reward 123 to a user account within the user account store 119. For example, as shown by an example in FIG. 1, the reward logic 118 can issue the reward 123 to a user account associated with the publisher (i.e., the auction user who enabled the link generator 111 to generate the script request 126). Alternatively, the reward logic 118 can issue the reward 123 directly to the publisher via other means, such as, for example, through the publisher's publishing component 116 or publisher interface 115. The reward 123 can be in the form a financial reward. However, the reward 123 can also involve any benefit relating to the auction forum or otherwise.

In variations, the reward logic 118 can issue the reward 123 to the publisher on whose webpage or resource the winning bid was submitted. Additionally, the reward logic 118 can communicate with the script manager 114 and/or the auction manager 113 in order to determine the various publishers and automatically issue a reward 123 to all or any number of the determined publishers. The reward logic 118 can issue the reward 123 in response to a publisher request for a particular script. Additionally or as an alternative, the reward logic 118 can be configured to issue a reward 123 to bidders based on submitted bids. Further, rewards 123 may be issued on a per-bid basis to either the bidders or the publishers. In such examples, a publisher can be rewarded for each bid submitted over the interactive component 117 published on the publisher's resource 129. Alternatively, a publisher may be issued a reward 123 based on having the most bids submitted, or a bid that surpasses a reserve price, or the eventual winning bid submitted over that publisher's interactive component 117.

In practice, as shown by examples of FIG. 1, the publisher can visit the auction interface 110 and view or participate in one or more auctions 112. The auctions 112 can be viewed any time prior to or during the auction period. The publisher can enable the link generator 111 for a particular auction 112, whereupon the link generator 111 can generate and deliver or otherwise communicate a script request 126 corresponding to the auction to the script manager 114. The script request 126 can include information relating to the particular auction 112. Additionally, the script request 126 can include the publisher's ID 122. The script manager 114 can then process the script request 126 and communicate the script 127 pertaining to the particular auction 112. Additionally, the script manager 114 can also communicate information relating to the script request 126, such as an auction ID and the publisher's ID, to the user account store 119. The publisher interface 115 can then receive the script 127 and subsequently publish the script 127 on the publishing component 116, thereby resulting in the interactive component 117 displayed on the publishing component 116.

The interactive component 117 can be configured to communicate directly with the transaction logic 135, such that viewers and/or users of the publishing component 116 can interact with the particular auction 112. For example, a user visiting the publishing component 116 can utilize the interactive component 117, and input a bid 132 or update request 131. The interactive component 117 can then communicate that input directly to the particular auction 112 via the transaction logic 135. The communication between the interactive component 117 and the transaction logic 135 can include a time stamp for the bid 132, the bidder ID 133, the update request 131, etc. Additionally, the transaction logic 135 may then communicate back to the interactive component 117 updates or updated content 128 pertaining to the particular auction 112.

The publishing component 116 or the publisher interface 115 can communicate the publisher's ID 122 to the reward logic 118. The reward logic 118 can then correlate the publisher's ID 122 with the publisher's user account in the user account store 119 and issue a reward 123 to the publisher's account.

The auction manager 113 can be configured to communicate with the transaction logic 135 and/or the auction interface 110. The auction manager 113 can deliver auction records 124 to the auction database 120. The auction manager 113 can also receive information regarding a publisher event 125. The publisher event 125 can include, for example, a script request 126, an entered bid 132, a script publication, a completed auction, an issued reward 123, etc. The auction manager 113 can communicate the publisher event 125 to the user account store 119 or directly to the reward logic 118. Upon receiving the publisher event 125 data, the user account store 119 or the reward logic 118 can direct the reward 123 to the publisher's account. The reward 123 can be in the form a financial reward. However, the reward 123 can also involve any benefit relating to the auction forum or otherwise.

Additionally or as an alternative, the transaction logic 135 can be configured to receive and process the script request 126, and then subsequently communicate the proper script 127 directly to the publisher interface 115, and/or directly to the publishing component 116 itself. In these examples, the transaction logic 135 can also be configured to receive inputs from the interactive component 117. The inputs can include update requests 131, the publisher ID 122, a bidder ID 133, bids 132, time stamps for bids, and/or bidder information. Additionally or as an alternative, the transaction logic 135 can be configured to provide live content pertaining to the auction to the interactive component 117.

In practice, an auction participant cannot be required to engage the auction directly through the auction interface 110, but instead can have the ability to transact and/or communicate via the interactive component 117 on the outside publishing component 116.

In some variations, the reward logic 118 can be included to issue or otherwise communicate the reward 123 to, for example, the publisher's account in the user account store 119. The reward logic 118 can receive the publisher ID 122 directly from the publishing component 116. Alternatively, the publisher ID 122 can be attached to the script request 126 and communicated by the transaction logic 135. For example, the reward logic 118 can be configured to receive data directly from the transaction logic 135. Thus, in practice, the publisher can enable the link generator 111 for a particular auction 112, which would generate the script request 126 directly to the transaction logic 135. The transaction logic 135 can then direct the correlated script 127 directly to the publisher interface 115 and/or publishing component 116, whereupon the script can be published. The transaction logic 135 can also direct the publisher ID 122 directly to the reward logic 118 which can, in turn, issue a reward 123 to the publisher's account in the user account store 119.

Further variations are also contemplated. For example, the auction interface 110 can include auctions 112 each having its own link generator 111. In practice, the publisher can enable the link generator 111 associated with a particular auction 112 and embed the interactive component 117 directly to the publishing component 116. The process for such an example can involve a simple copy/paste action on the part of the publisher. Thus, the interactive component 117 can be embedded on, for example, the publisher's webpage or blog, and users can then interact with the particular auction 112 via the interactive component 117. Additionally, the reward logic 118 can be configured to communicate with the auction interface 110, or interactive component associated with each particular auction 112, and provide the reward 123 to a publisher account associated with the auction forum.

The system 100 can involve features where one or more components or elements of the system are incorporated into a single component. For example, a single processor can perform the functions of the auction manager 113, link generator 111, and/or transaction logic 135. Also, for example, a processor can perform one or more functions involved in the system 100, such as functions described above associated with the link generator 111, the auction interface 110, the transaction logic 135, the auction manager 113, the script manager 114, the reward logic 118, the user account store 119, and/or the interactive component 117. Thus, combinations of elements as described in FIG. 1 can be utilized to perform the overall function of enabling publication of a script 127 associated with a particular auction 112 upon a publishing component 116.

Methodology

Figure 2:
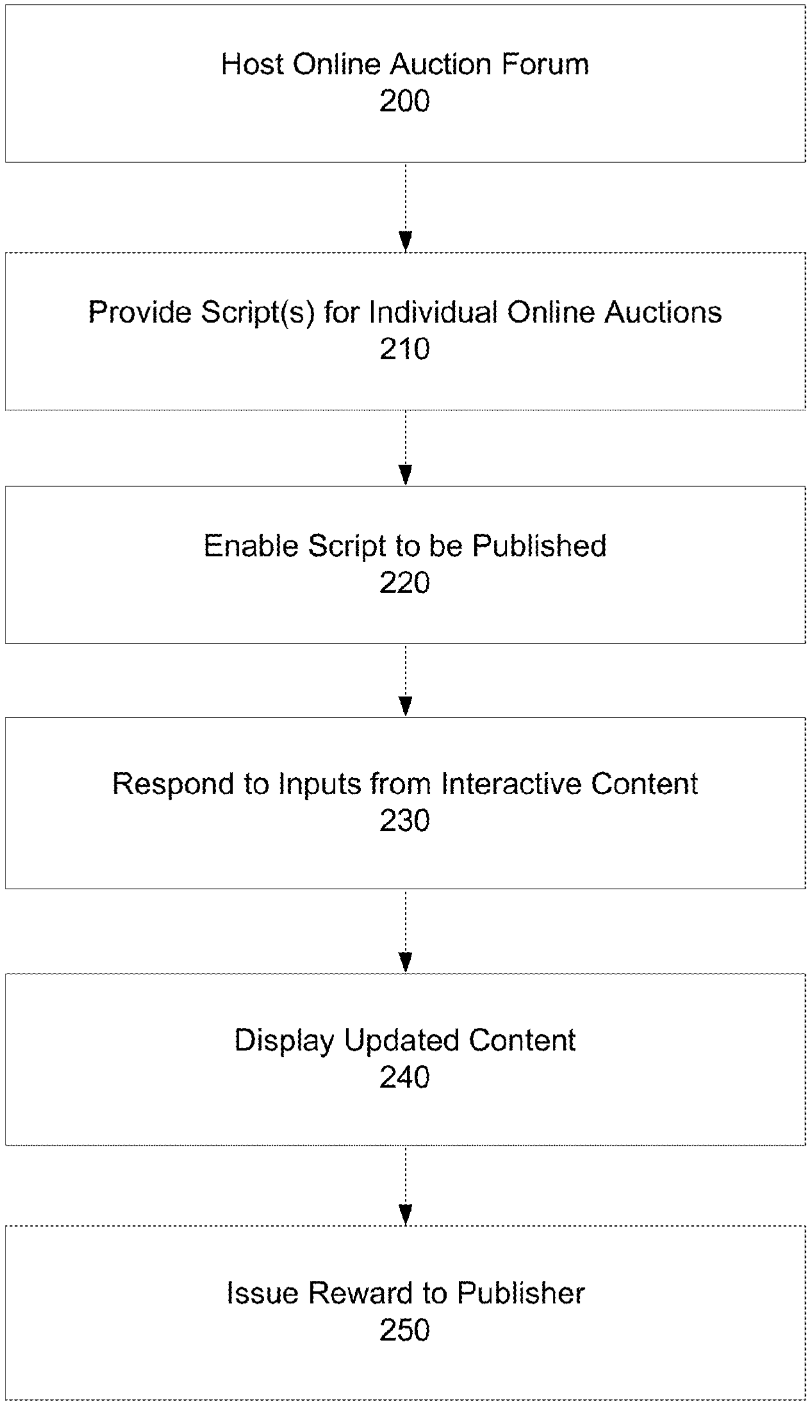
FIG. 2 illustrates an example method of script publication onto a user selected resource.

FIG. 2 illustrates an example method of enabling script publication upon a publishing component. Methods as described by examples of FIG. 2 can be implemented using, for example, a system 100 as described by an example of FIG. 1. Accordingly, reference can be made to elements of system 100, as shown in an example of FIG. 1, for the purpose of illustrating suitable components or elements for performing a step or sub step being described.

With reference to FIG. 2, an auction service can host an online auction forum (200), thereby allowing users to view information relating to one or more auctions and/or participate in the auctions themselves. The participation can involve submitting one or more bids for a particular item, providing a confidential maximum bid, and/or interacting with multiple auctions at the same time. The auction forum can provide one or more scripts for individual online auctions (210). The script requests 126 can relate to a particular auction that the user is interested in following. For example, the user can be interested in a particular item of real estate that is up for auction on the auction forum. The user can enable the link generator 111 for that particular auction, whereupon the script 127 corresponding to the auction can be requested by the user. Upon receiving the script request 126, the auction forum can then enable the script to be embedded in a user-selected online publication (220). The script 127 can be published in any manner. For example, the script may be delivered and embedded upon a publishing component 116 associated with the user.

In further examples, the user can have a publishing component 116, such as a webpage, on a publisher interface 115, such as a social media platform. Upon receiving the script 127, the publisher interface 115 can embed the script 127 upon the publishing component 116. In practical effect, for example, the social media platform can embed the script 127 on the user's webpage, thereby generating an embedded interactive component 117 upon the user's webpage.

The interactive component 117 can be in the form of an interactive interface capable of communicating with the auction forum. Alternatively, the interactive component 117 can be a scroll over icon, providing information in a new window relating to the particular auction. Still further, the interactive component 117 can include a display that can provide other users with auction information such as, for example, current highest bid, time left in the auction, etc. The display can also allow other users to interact with the auction and submit bids accordingly. Thus, information inputted into the interactive component 117 can be transmitted or communicated to the auction forum in order to update information relating to that particular auction.

The auction forum can then respond to inputs from the interactive component (230). For example, the communications can involve update requests 131 or bids 132. In such examples, the auction forum can, in turn, communicate updated content 128 relating to the particular auction, or enter the bids 132 into the particular auction. In effect, users of the interactive component 117, located outside the auction forum, can participate in the auction associated with that particular script 127. The auction forum can also display the updated content on the respective auction forum interface (240). Communications from the interactive component 117 can also ultimately be directed to the reward logic 118, which can be configured to issue a reward 123 to the publisher (250). The reward logic 118 can receive information such as publisher ID 122, and/or information relating to the publisher event 125 as described above. The reward logic 118 can receive such information from the script manager 114, the auction manager 113, the publisher interface 115, the publishing component 116, the transaction logic 135, and/or directly from the interactive component 117. The reward 123 can be in the form a financial reward. However, the reward 123 can also involve any benefit relating to the auction forum or otherwise.

The method as shown by an example in FIG. 2 can be implemented in an auction forum involving multiple auctions 112 and multiple interactive components 117 at any given time. Thus, user interaction can be possible with multiple interactive components 117 over several publisher interfaces 115 involving associated auctions 112.

Figure 3:
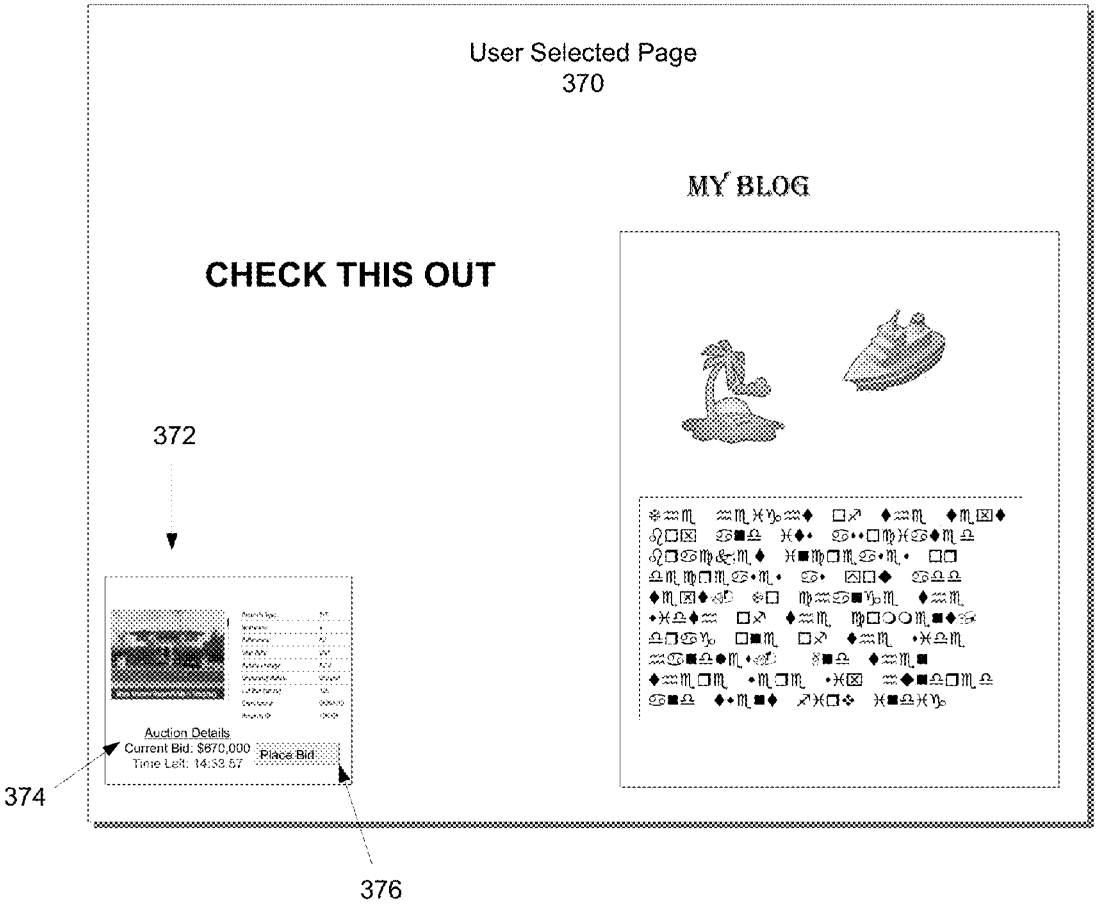
FIG. 3 is an example of an interactive component embedded on a user selected resource.

FIG. 3 illustrates an example of a supplemental content 372 embedded on a user selected page 370, such as a user webpage on a social media platform. With further reference to FIG. 1, the user of the auction interface 110 can enable the link generator 111 for a particular auction to ultimately embed the supplemental content 372 corresponding to that auction on the user's selected page 370. In an example of FIG. 3, the user can observe auction information 374 corresponding to the particular auction, such as the current bid or the time left in the auction. As an addition or an alternative, the supplemental content 372 can include a text entry box 376 configured to receive inputs and submit them to the auction forum. For example, the user can place a bid for the item being auctioned by typing and submitting an amount into the text entry box 376. The input can then be directed to the auction forum, where the inputs can be registered and the auction updated.

Additionally, any user visiting the selected page 370 can also input a bid into the embedded supplemental content 372. The bid can be directed to the auction forum, where the current bid can be adjusted accordingly. Furthermore, the user(s) can submit update requests for the particular auction, in which case the auction forum can be configured to provide updated content to the supplemental content 372. Thus, the auction information 374 on the supplemental content 372 can list current information regarding the particular auction. Alternatively, updated content from the particular auction can be streamed or otherwise submitted in real time to the supplemental content 372 on the user selected page 370.

Computer System

Figure 4:
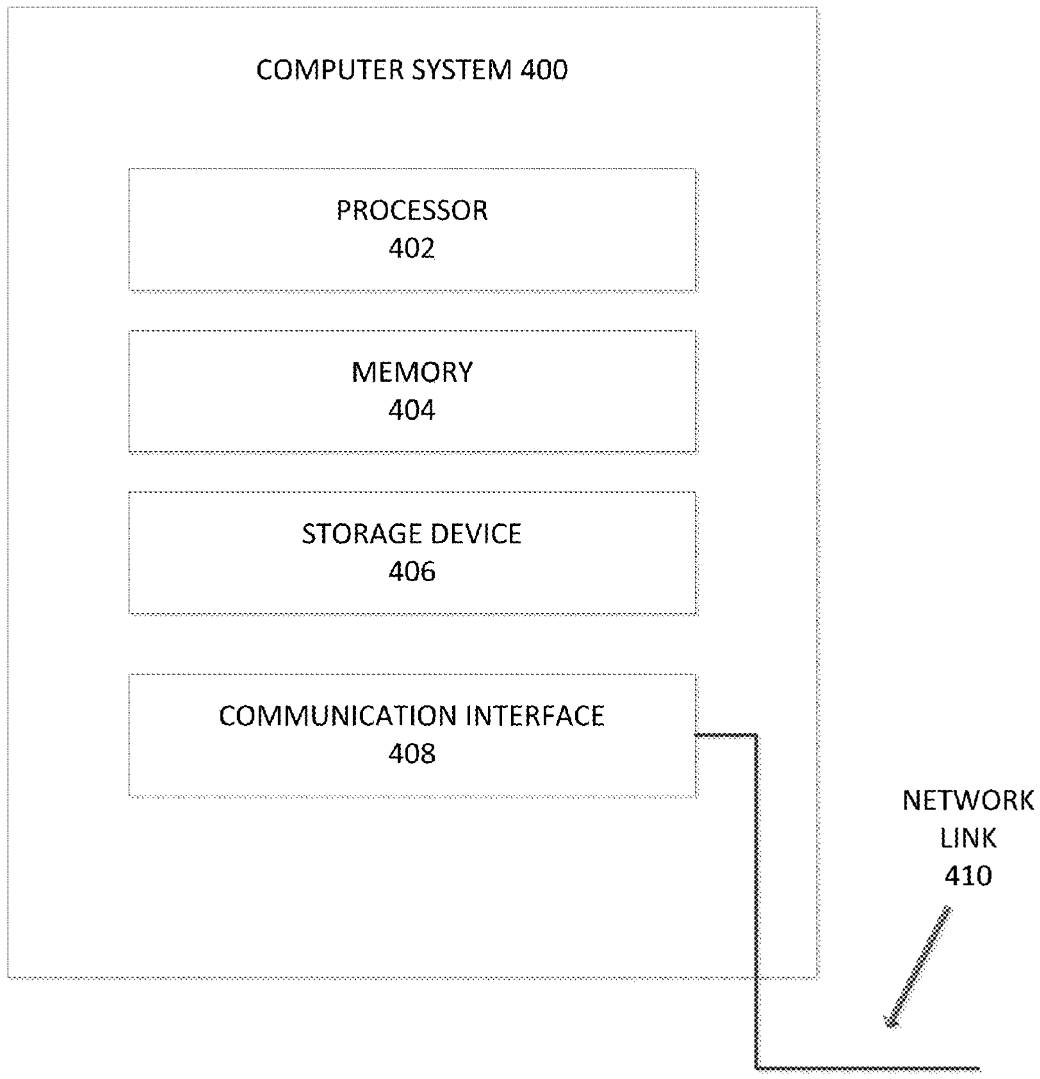
FIG. 4 is a block diagram that illustrates a computer system upon which examples described herein can be implemented.

FIG. 4 is a block diagram that illustrates a computer system upon which examples described herein can be implemented. For example, in the context of FIG. 1, system 100 can be implemented using one or more servers such as described by FIG. 4.

Computer system 400 includes processor 402, memory 404 (including non-transitory memory), storage device 406, and communication interface 408. Computer system 400 includes at least one processor 402 for processing information. Computer system 400 also includes the main memory 404, such as a random access memory (RAM) or other dynamic storage device, for storing information and instructions to be executed by processor 402. Main memory 404 also can be used for storing temporary variables or other intermediate information during execution of instructions to be executed by processor 402. Computer system 400 can also include a read only memory (ROM) or other static storage device for storing static information and instructions for processor 402. The storage device 406, such as a magnetic disk or optical disk, is provided for storing information and instructions. The communication interface 408 can enable the computer system 400 to communicate with one or more networks through use of the network link 410 (wireless or wireline). The communication interface 408 can communicate with one or more of the components and/or logics as shown by an example of FIG. 1 by way of, for example, Ethernet link, the Internet, or other cloud network.

Variations described herein are related to the use of computer system 400 for implementing the techniques described herein. According to one example, those techniques are performed by computer system 400 in response to processor 402 executing one or more sequences of one or more instructions contained in main memory 404. Such instructions can be read into main memory 404 from another machine-readable medium, such as storage device 406. Execution of the sequences of instructions contained in main memory 404 causes processor 402 to perform the process steps described herein. In alternative variations, hard-wired circuitry can be used in place of or in combination with software instructions to implement variations described herein. Thus, examples described are not limited to any specific combination of hardware circuitry and software.

Although illustrative variations have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

What is claimed is:

1. A computer-implemented method for managing an auction forum, the method performed by one or more processors and comprising:

receiving input from a publisher identifying an auction for an item of interest;

associating an auction identifier with a publisher identifier for the auction;

generating a script that is linked to the auction hosted on the auction forum;

transmitting the script to be published on an external resource selected by the publisher, the script including instructions that are executable through a corresponding browser of one or more users that access the external resource in order to cause each of the corresponding browsers to directly access the auction hosted on the auction forum, and to provide an interactive component embedded on the external resource that includes real-time content from the auction hosted on the auction forum, the real-time content corresponding to the auction;

providing, through the interactive component, real time auction content corresponding to the auction to the one or more users who access the external resource;

receiving, through the interactive component, one or more inputs for the auction, wherein the one or more inputs are each provided through the corresponding browser of each of the one or more users who render the interactive component when the auction is ongoing; and updating one or more parameters of the auction based at least in part on one or more of the inputs, the one or more parameters including a current bid.

2. The computer-implemented method of claim 1, further comprising processing user inputs inputted on the interactive component for the auction, the user inputs including one or more bids from one or more users interacting with the interactive component.

3. The computer-implemented method of claim 2, wherein the user inputs include a request for more information from the one or more users interacting with the interactive component.

4. The computer-implemented method of claim 1, further comprising issuing a reward to the publisher.

5. The computer-implemented method of claim 4, wherein one or more processors are to issue the reward in response to a winning bid being submitted on the interactive component published on the external resource.

6. The computer-implemented method of claim 5, wherein the external resource is a webpage on a social media platform associated with the publisher.

7. The computer-implemented method of claim 1, wherein the real-time content includes a live feature displaying a time left and a current highest bid in the auction.

8. A system for managing an auction forum, the system comprising:
- one or more processors; and
- a memory resource storing instructions that, when executed by the one or more processors, cause the one or more processors to:
  - receiving input from a publisher identifying an auction for an item of interest;
  - associating an auction identifier with a publisher identifier for the auction;
  - generate a script that is linked to the auction hosted on the auction forum;
  - transmit the script to be published on an external resource selected by the publisher, the script including instructions that are executable through a corresponding browser of one or more users that access the external resource in order to cause each of the corresponding browsers to directly access the auction hosted on the auction forum, and to provide an interactive component embedded on the external resource that includes real-time content from the auction hosted on the auction forum, the real-time content corresponding to the auction;
  - receive, through the interactive component, one or more inputs for the auction, wherein the one or more inputs are each provided through the corresponding browser of each of the one or more users who render the interactive component when the auction is ongoing; and
  - update one or more parameters of the auction based at least in part on one or more of the inputs, the one or more parameters including a current bid.

9. The system of claim 8, wherein the instructions, when executed, further cause the one or more processors to process user inputs inputted on the interactive component for the auction, the user inputs including one or more bids from one or more users interacting with the interactive component.

10. The system of claim 9, wherein the user inputs include a request for more information from the one or more users interacting with the interactive component.

11. The system of claim 8, wherein the instructions, when executed further cause the one or more processors to issue a reward to the publisher.

12. The system of claim 11, wherein one or more processors are to issue the reward in response to a winning bid being submitted on the interactive component published on the external resource.

13. The system of claim 12, wherein the external resource is a webpage on a social media platform associated with the publisher.

14. The system of claim 8, wherein the real-time content includes a live feature displaying a time left and a current highest bid in the auction.

15. A non-transitory computer-readable medium storing instructions for managing an auction forum that, when executed by one or more processors, cause the one or more processors to:
- receiving input from a publisher identifying an auction for an item of interest;
- associating an auction identifier with a publisher identifier for the auction;
- generate a script that is linked to the auction hosted on the auction forum;
- transmit the script to be published on an external resource selected by the publisher, the script including instructions that are executable through a corresponding browser of one or more users that access the external resource in order to cause each of the corresponding browsers to directly access the auction hosted on the auction forum, and to provide an interactive component embedded on the external resource that includes real-time content from the auction hosted on the auction forum, the real-time content corresponding to the auction;
- receive, through the interactive component, one or more inputs for the auction, wherein the one or more inputs are each provided through the corresponding browser of each of the one or more users who render the interactive component when the auction is ongoing; and
- update one or more parameters of the auction based at least in part on one or more of the inputs, the one or more parameters including a current bid.

16. The non-transitory computer-readable medium of claim 15, wherein the instructions, when executed, further cause the one or more processors to process user inputs inputted on the interactive component for the auction, the user inputs including one or more bids from one or more users interacting with the interactive component.

17. The non-transitory computer-readable medium of claim 15, wherein the instructions, when executed further cause the one or more processors to issue a reward to the publisher.

18. The non-transitory computer-readable medium of claim 17, wherein one or more processors are to issue the reward in response to a winning bid being submitted on the interactive component published on the external resource.

19. The non-transitory computer-readable medium of claim 18, wherein the external resource is a webpage on a social media platform associated with the publisher.

20. The non-transitory computer-readable medium of claim 15, wherein the real-time content includes a live feature displaying a time left and a current highest bid in the auction.

* * * * *